US009106972B2

(12) United States Patent
Nandiraju (10) Patent No.: US 9,106,972 B2
(45) Date of Patent: Aug. 11, 2015

(54) SOCIAL NETWORKING FOR BANDWIDTH CONSERVATION IN VIDEO ON DEMAND SYSTEMS (75) Inventor: Nagesh S. Nandiraju, North Wales, PA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 84 days.

(21) Appl. No.: 12/982,450

(22) Filed: Dec. 30, 2010

(65) Prior Publication Data

US 2012/0174169 A1    Jul. 5, 2012

(51) Int. Cl.
| | |
|---|---|
| *H04N 7/173* | (2011.01) |
| *H04N 21/6543* | (2011.01) |
| *H04N 21/2385* | (2011.01) |
| *H04N 21/472* | (2011.01) |
| *H04N 21/25* | (2011.01) |
| *H04N 21/433* | (2011.01) |
| *H04N 21/4335* | (2011.01) |
| *H04N 21/466* | (2011.01) |
| *H04N 21/4788* | (2011.01) |

(52) U.S. Cl.
CPC ....... *H04N 21/6543* (2013.01); *H04N 21/2385* (2013.01); *H04N 21/252* (2013.01); *H04N 21/4334* (2013.01); *H04N 21/4335* (2013.01); *H04N 21/4668* (2013.01); *H04N 21/472* (2013.01); *H04N 21/4788* (2013.01)

(58) Field of Classification Search
CPC .......................... H04N 21/2385; H04N 21/472
USPC .................................. 725/87, 97, 93, 99, 109
See application file for complete search history.

(56) References Cited

U.S. PATENT DOCUMENTS

| | | | |
|---|---|---|---|
| 2009/0021474 A1 | 1/2009 | Bentley et al. | |
| 2009/0030906 A1* | 1/2009 | Doshi et al. | 707/9 |
| 2009/0049098 A1* | 2/2009 | Pickelsimer et al. | 707/104.1 |
| 2009/0319603 A1 | 12/2009 | Baldwin et al. | |
| 2010/0064325 A1 | 3/2010 | Fishman et al. | |
| 2010/0169917 A1 | 7/2010 | Harboe et al. | |
| 2010/0325675 A1* | 12/2010 | Smoyer et al. | 725/97 |

OTHER PUBLICATIONS

PCT Search Report & Written Opinion, RE: Application #PCT/US2011/067456; Mar. 26, 2012.
Montpetit, et al, "The future of IPTV; Connected, mobile personal and social", Multimedia Tools & Applications, Kluwer Academic Publishers, BO, vol. 53, No. 3; Mar. 20, 2010; pp. 519-532.

(Continued)

*Primary Examiner* — Pankaj Kumar
*Assistant Examiner* — Sahar Baig
(74) *Attorney, Agent, or Firm* — Remarck Law Group PLC (57) ABSTRACT A method is disclosed for using social networking information to conserve bandwidth in a video-on-demand (VOD) system operated by a service provider. In a VOD server system, a request for a VOD content item is accepted from a first client system associated with a user of the VOD system. A list of social networking friends of the user is obtained. A node-sharing group of the list of social networking friends is determined. The node-sharing group includes the first client system and zero or more client systems sharing a distribution node of the VOD server system with the first client system. A video delivery start message is sent through the shared distribution node to each client system in the node-sharing group.

20 Claims, 4 Drawing Sheets (56) References Cited

OTHER PUBLICATIONS

Baca M, et al, "Television meets Facebook: Social Networks Through Consumer Electronics", Internet citation, 2008. pp. 1-2.

G. Harboe, et al., "The Uses of Social Television," ACM Computers in Entertainment, vol. 6, No. 1, Article 8 (May 2008).

Bazaar Labs, "Introducing Miso—The Social Entertainment Game" (Mar. 10, 2010). URL: http://bazaarlabs.wordpress.com/2010/03/10/introducing-miso-the-social-entertainment-game/.

Ryan Lawler, "Tunerfish Aims to Chart the Social Graph for Video," GigaOM.com (May 24, 2010). URL: http://gigaom.com/video/tunerfish-aims-to-chart-the-social-graph-for-video/.

Robin Wauters, "Comcast's Tunerfish Jumps Out of the Water At #TCDisrupt," TechCrunch.com (May 24, 2010). URL: http://techcrunch.com/2010/05/24/tunerfish-jumps-out-of-the-water-at-tcdisrupt/.

Robert Scoble, "Is Comcast doing to TV what Foursquare is doing to location? Exclusive first look at Tunerfish," Scobleizer.com (May 24, 2010). URL: http://scobleizercom/2010/05/24/is-comcast-doing-to-tv-what-foursquare-is doing-to-location-exclusive-first-look-at-tunerfish/.

Tracy Swedlow, "Philo, A New Social TV Service Featuring Interactive Games, Launches on iPhone and Web," InteractiveTV Today (Jun. 2, 2010). URL: http://www.itvt.com/story/6883/philo-new-social-tv-service-featuring-interactive-games-launches-iphone-and-web.

"How to Get Started with Clicker Social," Clicker Blog (Jul. 23, 2010). URL: http://www.clicker.com/blog/clicker-social-how-to-3120.html.

CBS Corporation, "TV.com Launches 'TV.com Relay'"(press release, Aug. 12, 2010). URL: http:www.cbscorporation.com/news-article.php?id=669.

Miguel Helft, "With Facebook Tie, Clicker Wants to Be Personal Web TV Guide," New York Times BITS Blog (Dec. 15, 2010). URL: http://bits.blogs.nytimes.com/2010/12/15/with-facebook-tie-clicker-wants-to-be-personal-web-tv-guide/.

* cited by examiner

SOCIAL NETWORKING FOR BANDWIDTH CONSERVATION IN VIDEO ON DEMAND SYSTEMS

BACKGROUND

Video-on-Demand (VOD) typically refers to an area of technology that allows client device end-users to select video content or other content from a source, such as a central server, for viewing on a suitable end-user display device, such as a television (TV) or a computer monitor. One type of VOD system is a "streaming" VOD system, in which video content or other content is streamed from the source to an end-user client device and viewing of the content can begin as soon as the content streams over a suitable network connection from the source to the end-user client device. Another type of VOD system is a "download" VOD system, in which content initially is downloaded to a video processing device, such as a set-top box, before end-user viewing begins. Typically, almost all download VOD systems and many streaming VOD systems allow the end-user to pause, fast forward, and rewind the content, as well as to view the content at any time.

A VOD server system is typically maintained by a service provider, which can be, for example, a television service provider (e.g., a national or local television network), a cable television service provider or multiple system operator (MSO), an Internet service provider, a satellite broadcast system service provider, or other suitable service provider.

End-users typically desire minimal content download latencies. However, for the service provider, bandwidth requirements typically grow linearly with the number of requests. In some cases, delays can occur even though a service provider provides the required bandwidth.

In addition, a growing population of end-users are interested in social networking and want to easily share viewing information about selected video content (such as favorite, recently viewed, or currently viewed television programs or movies) with their contacts, friends, or connections using social networking portals. Social networking portals include general-interest portals such as Facebook, MySpace, Orkut, Twitter, and Google Buzz, as well as portals specifically directed to social television (e.g., sharing viewing information), such as Tunerfish, Miso, Philo, Clicker Social, and TV.com Relay.

SUMMARY

In one embodiment of the present invention, a method is provided for using social networking information to conserve bandwidth in a video-on-demand (VOD) system operated by a service provider. In a VOD server system, a request for a VOD content item is accepted from a first client system associated with a user of the VOD system. A list of social networking friends of the user is obtained. A node-sharing group of the list of social networking friends is determined. The node-sharing group includes the first client system and zero or more client systems sharing a distribution node of the VOD server system with the first client system. A video delivery start message is sent through the shared distribution node to each client system in the node-sharing group.

In another embodiment of the present invention, a method is provided for using social networking information in a VOD system. In a receiving client system associated with a receiving user, a video delivery start message is received for a VOD content item that was requested by a requesting user of the VOD system. The requesting user and the receiving user are both users of a social networking server of the VOD system. The receiving client system and a client system associated with the requesting user share a distribution node of the VOD system. A priority value of the VOD content item is determined. When a local storage of the receiving client system has insufficient storage space for the VOD content item, locally stored content in the receiving client system having a lower priority value than the VOD content item is deleted. When the local storage has sufficient storage space for the VOD content item, a multicast of the VOD content item is received through the shared distribution node, and the VOD content item is stored in the local storage.

In a further embodiment of the present invention, a VOD system is provided. The VOD system includes a server system comprising a VOD server and a social networking server communicatively coupled to each other and to an access network. A plurality of distribution nodes is communicatively coupled to the access network, and each of the plurality of distribution nodes is configured to distribute VOD content downstream to one or more client systems. The social networking server is configured to store, in a social television database, social networking information associated with a user of a first client system. The social networking information comprises a list of social networking friends of the user. The server system is configured to determine a node-sharing group comprising the first client system and zero or more client systems associated with the social networking friends of the user. Each client system of the node-sharing group shares a common distribution node of the plurality of distribution nodes.

DETAILED DESCRIPTION

Aspects of the present invention provide a method for bandwidth conservation using social networking in a VOD system. In an embodiment, a VOD server system is able to deliver a VOD content item proactively to a requesting user and to social networking friends of that user who share a common distribution node. In such an embodiment, the VOD content item can be multicasted, and no additional access network resources have to be used for this purpose, thus conserving critical system bandwidth, reducing load on the access network, and helping to more efficiently use system resources.

Thus, aspects of the present invention are able to improve customer satisfaction, in cases when a customer comes to know that his friend is watching a movie and decides to watch the same movie. In a conventional VOD system, the movie then has to be requested from the VOD server, which in turn has to find the required bandwidth to serve the customer, which may involve noticeable delay, and depending on then-current load in the access network, further delays may occur. Conversely, in an embodiment, the customer who has proactively been served that movie is able to begin viewing without delay, and is likely to be delighted.

Before describing in detail embodiments that are in accordance with the present invention, it should be observed that the embodiments reside primarily in combinations of method steps and apparatus components related to a system and method for bandwidth conservation using social networking in a VOD system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
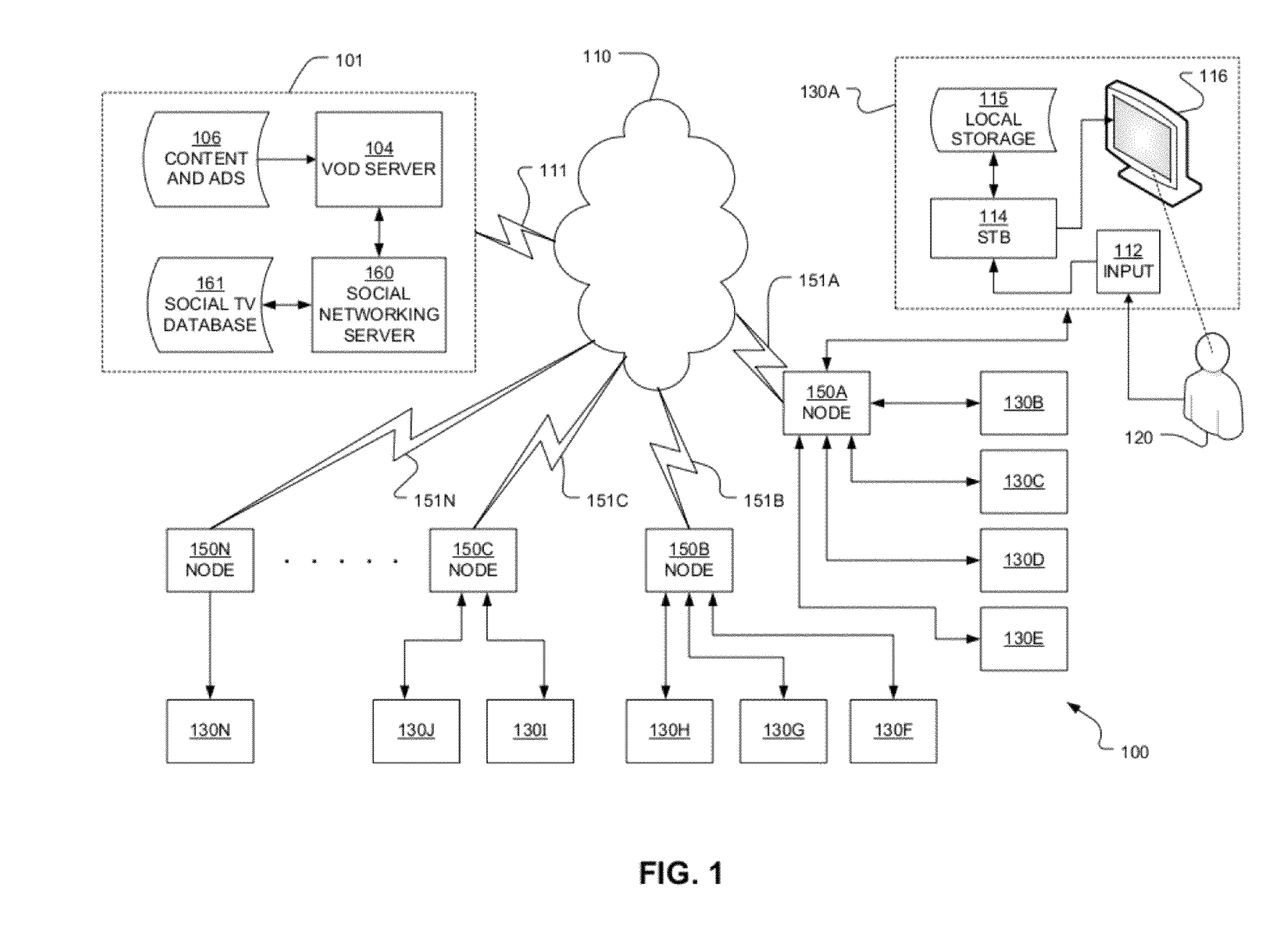
FIG. 1 is a block diagram that illustrates an exemplary VOD system in accordance with an embodiment of the present invention.

FIG. 1 illustrates an exemplary VOD system 100 in accordance with an embodiment of the present invention. However, it will be understood by a person having ordinary skill in the art that aspects of the invention can be practiced using a system having other than the specific features or limitations of the illustrative VOD system 100 described herein.

VOD system 100 includes a server system 101 and a plurality of distribution nodes 150A, 150B, 150C, . . . 150N (each a node 150). Server system 101 and nodes 150 are connected by an access network 110. For example, communication link 111 connects the server system 101 to the access network 110, and communication links 151A, 151B, 151C, . . . 151N connect the nodes 150 to the access network 110. VOD system 100 includes a plurality of client systems 130A . . . 130N (each a client system 130).

Each node 150 is connected to one or more client systems 130; for example, so that each node 150 can exchange data with and deliver content (e.g., from VOD server 104) downstream to its connected client systems 130. For example, FIG. 1 depicts that node 150A is connected to client systems 130A, 130B, and 130C; node 150B is connected to client systems 130D, 130E, and 130F; node 150C is connected to client systems 130G and 130H; and node 150N is connected to client system 130N. An exemplary client system 130A is depicted, for illustrative purposes, in greater detail than other client systems 130.

The server system 101 stores, manages and delivers VOD content requested by a client system 130 via the access network 110. Access network 110 and communication links 111, 151 can include, for example, a transmission medium such as an optical fiber, a coaxial cable, or other suitable transmission media or wireless telecommunications. In an exemplary embodiment, access network 110 comprises a hybrid fiber coaxial (HFC) network.

The server system 101 typically is located in a headend (not shown) or other suitable location within the VOD system 100. The headend typically is a regional or local hub that is part of a larger service provider distribution system, such as a cable television distribution system. The VOD system 100 and other conventional VOD systems typically are based on a central server architecture. In such an architecture, the server system 101 typically is centrally located with respect to a plurality of nodes 150, and connects to each node 150 directly via a dedicated transmission medium (in some embodiments, communication links 151) of access network 110. In other embodiments, the VOD system 100 can be distributed; for example, VOD system 100 can comprise a plurality of server systems 101 located in one or more headends.

In an embodiment, an exemplary server system 101 includes a VOD server 104, and a social networking server 160. Further embodiments can include a user interface (UI) server, a playout controller, and/or additional servers. In some embodiments, the functionality of some or all of the foregoing servers, controllers, or processors can be separated or combined with one another, and can be executed or hosted on one or more processors or servers.

Server system 101 also includes at least one database 106 (containing, for example, media content and advertisements), and can contain any number of additional databases; illustrative examples include a social television database 161, a metadata and/or rules database containing information about content in database 106, and a subscriber database. In some embodiments, database 106 and/or any of the additional databases can comprise a plurality of databases. In further embodiments, database 106, social television database 161, and/or any of the additional databases can be distributed over a plurality of servers and/or storage media.

In still further embodiments, either or both of social networking server 160 and social TV database 161 may be external to server system 101 and accessible to server system 101 via a communications network (e.g., access network 110, \or the Internet). For example, in some embodiments, social networking server 160 may be provided by a third party social networking provider (i.e., a provider other than the service provider that provides server system 101).

Server system 101 receives, through access network 110, requests from a client system 130. Server system 101 and client system 103 exchange information with one another through access network 110; for example, a user interface (UI) server (not shown) of server system 101 can send information for presentation to a user 120, and the client system 130 can send to the server system 101 information, commands, and the like, received in set-top box 114 via input device 112 from user 120. In an embodiment, each client system 130 can be associated with one or more users 120.

In an illustrative example, server system 101 can include a playout controller (not shown) that controls VOD server 104 for delivery of the playout of a content package provided by server system 101. In an illustrative example, when a user 120 selects a VOD program, or broadcast content, the playout controller can establish a playout schedule for the content and advertising elements based on content rules. The playout controller can then establish a playlist of the desired content including the sequencing of program content and advertisement content; for example, by inserting additional advertisement content into an original content program compiled by VOD server 104.

VOD server 104 receives requests for content (e.g., from client system 130, or from a playout controller), interprets the requests, pulls requested content from database 106, and delivers to client system 130 a content package corresponding to the requested content. For example, the content package can be delivered via a video processor (not shown) in server system 101 that receives data from VOD server 104 and prepares and sends the data through access network 110 following proper protocols.

Client system 130 includes a set-top box (STB) 114, an input device 112, and a display 116. Examples of display 116 include a television or a monitor. A client system 130 typically is located in end-user (subscriber) locations, such as a home or office of a user 120. Often, a home or other end-user location has only one client system 130, although in many cases, more than one client system 130 can be located in the same end-user location, e.g., as part of a home network or business network configuration.

It will be understood by a person having ordinary skill in the art that the terminology "set-top" does not in any way limit the physical placement of the device 114; that is, the STB 114 need not be positioned on top of a television set. Each set-top box 114 is any suitable signal processing device or system for processing video signals, such as any signal converter or decoder (set-top) box, or other suitable computing device or video device with set-top box and/or cable modem capabilities, including a residential gateway, an internet protocol (IP), satellite or cable digital video recorder, a digital video disk (DVD) recorder, a computer, or a home media server system. In further embodiments, set-top box 114 can be a laptop, notebook, or tablet computer, or a mobile device, or can be built into the display 116. An exemplary set-top box 114 comprises a computing device that connects the display 116 and an external signal source, turning the signal into a content stream that the display 116 is able to render and display. For example, set-top box 114 can convert data signals to audio/video content and output the data to display 116. Set-top box 114 is communicatively coupled to the display 116 via a wired or wireless connection.

A set-top box 114 can be completely or partially configured in the form of hardware circuitry and/or other hardware components within a larger device or group of components. Alternatively, set-top box 114 can be completely or partially configured in the form of software, e.g., as processing instructions or one or more sets of logic or computer code. In such configuration, the logic or processing instructions typically are stored in a data storage device, which typically is coupled to a processor or controller. Both the data storage device and the processor or controller can be included as part of a set-top box 114, although such is not necessary. The processor or controller accesses the necessary instructions from the data storage device and executes the instructions or transfers the instructions to the appropriate location within the set-top box 114. An exemplary set-top box 114 is able to receive input commands from input device 112 and send requests embodied in the input commands through access network 110 to server system 101.

A user 120 can operate input device 112 to send commands to the set-top box 114; for example, by using input device 112 to control a user interface (UI) application of STB 114 (e.g., for navigation and selection of content items from menus). Input device 112 is communicatively coupled to the set-top box 114 either via a wired or wireless connection. In some embodiments, input device 112 can be a remote control device. In further embodiments, input device 112 can be a computer (e.g., a desktop, laptop, notebook, or tablet computer), or a mobile device or smartphone, and/or can be completely or partially configured in the form of software running on a computer. In still further embodiments, input device 112 can be built into the set-top box 114.

In an exemplary embodiment, upon receipt of input commands, such as changing to a new channel, the UI application causes the set-top box 114 to send corresponding instructions upstream through access network 110 to server system 101. In an illustrative embodiment, server system 101 (e.g., in a UI server, not shown) is able to convert the instruction stream to a form that a playout controller can interpret, and sends the instructions to the playout controller, which requests content from VOD server 104, which interprets the request and pulls the requested content from database 106, and delivers the content to set-top box 114.

Database 106 stores items of content. The content can be any video and/or audio, non-limiting examples of which include movies, television programs, music, games, etc. Further, the content may be pre-assembled with advertisements disposed therein, or the playout controller may cause insertion of advertisements into requested content. In some embodiments, advertisements to be inserted are stored in database 106. An advertisement can be any video or audio that is not the content, non-limiting examples of which include commercials. The combination of content and advertisements, if included, is the content package.

Some social networking data can be associated with content (such as favorite, planned, recently viewed, or currently viewed television programs or movies), while other social networking data may not be directly related to content. A portion of social networking data, as more fully described below, can be stored, for example, in social TV database 161. In further embodiments, all or portions of social TV database 161 can be included in database 106 or in other additional databases.

Figure 2:
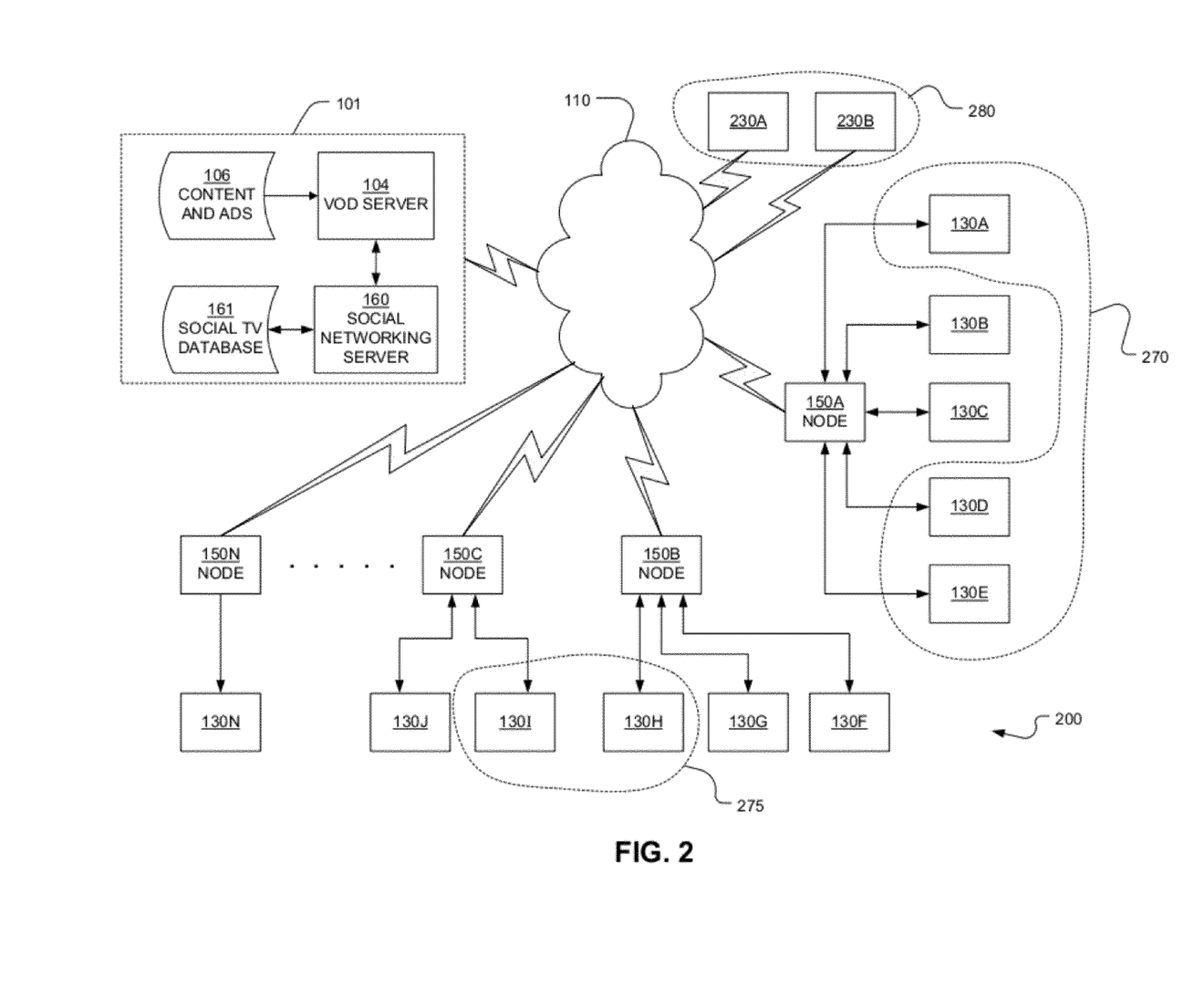
FIG. 2 is a block diagram that illustrates an exemplary VOD system in accordance with a further embodiment of the present invention.

FIG. 2 illustrates an exemplary VOD system 200 in accordance with a further embodiment of the present invention. The VOD system 200 includes features described above with respect to FIG. 1 (e.g., server system 101, a plurality of distribution nodes 150A . . . 150N, access network 110, and a plurality of client systems 130A . . . 130N).

In addition, communication links connect outside systems 230A, 230B to the access network 110, without an intervening distribution node 150. In an embodiment, the outside systems 230A, 230B may be client systems having a set-top box 114 that is associated with a different service provider (i.e., a service provider other than the service provider of server system 101), or may be client systems that include a general-purpose computer adapted for Internet browsing rather than a set-top box.

For illustrative purposes, the focus of the present discussion is client system 130A and its user 120. In some embodiments, user 120 of client system 130A can use social networking server 160 to build his online social network by adding social networking friends. In a further embodiment, user 120 of client system 130A can use social networking server 160 to access his online social network, e.g., by accessing a list of social networking friends via a social networking portal (not shown). (In the field of online social networking services, the term "friend" is known to include connections that may or may not include friendship or relationship in real life. The term "friend" is commonly used in services such as Facebook. In the present disclosure, the term "social networking friend" is also inclusive of other terms similarly used in online social networking, such as LinkedIn connections, Twitter followers/followees, and the like.) There are numerous conventional methods for finding and adding social networking friends to an online social network, which are well known to a person having ordinary skill in the art.

The list of social networking friends for user 120 can be securely maintained in social TV database 161. In an embodiment, proper authentication mechanisms, such as those known in the art, can be established to regulate access to information from social networking server 160 in order to maintain privacy.

In an embodiment, user 120 can share (e.g., with some or all of his social networking friends) social television data; for example, social networking data associated with content, e.g., favorite, planned, recently viewed, or currently viewed television programs or movies. User 120 can also have the ability to hide social television data from some or all social networking friends, if desired. In a further embodiment, user 120 can search his list of social networking friends to find who is watching the same program that he is currently watching.

In the illustrative example of FIG. 2, the user 120 of client system 130A has built an online network of social networking friends that includes the users of client systems 130D, 130E, 130H, 130I, and the users of outside systems 230A and 230B.

In some embodiments, user 120, using social networking server 160, is able to create a network of social networking friends who commonly subscribe to the service provider of server system 101.

In a further embodiment, user 120 has built a network of social networking friends using a third-party social networking portal. In an illustrative example, user 120 has built a network of social networking friends using a social networking portal such as Facebook, which provides a platform and application programming interface (API). Using such an API, the service provider of server system 101 can (with the permission of user 120) access the user's list of friends and certain information about those friends, can develop compatible social networking applications (e.g., an application hosted on social networking server 160), and can allow the user 120 and the user's friends to share information related to those applications. In this way, the service provider of server system 101 can use social networking server 160 to exchange information with a portal such as Facebook, can store information retrieved from a portal such as Facebook in social TV database 161, and can use features of a portal such as Facebook to allow the user 120 to more easily share data from social TV database 161 with social networking friends.

For discussion purposes, FIG. 2 depicts user 120's network of social networking friends in exemplary groups 270, 275, 280.

Node-sharing group 270 represents the user 120 of client system 130A and his social networking friends (users of client systems 130D and 130E) who are subscribers of the service provider of server system 101, and who share the same distribution node 150A.

Non-node-sharing group 275 represents social networking friends who are subscribers of the service provider of server system 101, but who do not share distribution node 150A with the user 120 of client system 130A. Group 275 includes the users of client systems 130H and 130I.

Non-subscriber group 280 represents social networking friends who are not subscribers of the service provider of server system 101, and who are therefore unable to receive VOD content from VOD server 104. Group 280 includes the users of outside systems 230A and 230B.

Figure 3:
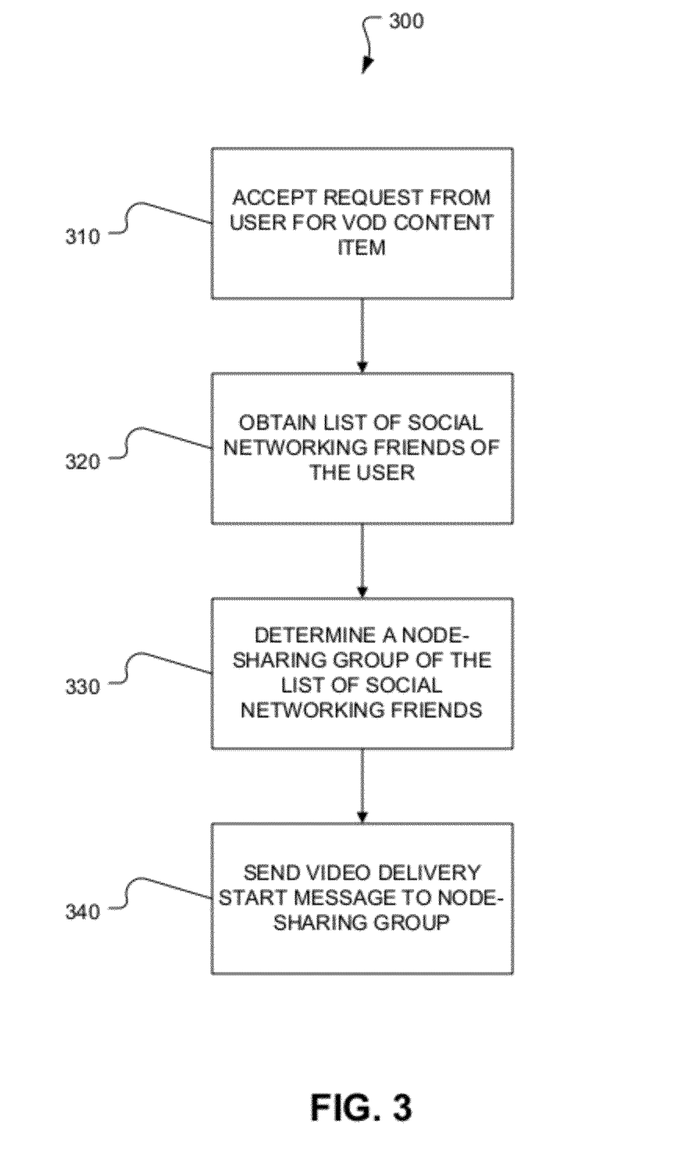
FIG. 3 is a flow diagram that illustrates a method in a server system according to an embodiment of the present invention.

FIG. 3 is a flow diagram that illustrates a method 300 in a server system 101 according to an embodiment of the present invention. The method 300 provides proactive delivery of VOD content items; e.g., by transmitting a movie or a program over the cable network to the requesting viewer (user 120) and proactively transmitting the same content item to some of user 120's social networking friends.

In one embodiment, method 300 includes a step 310 of accepting a request for a content item. For example, user 120 of client system 130A starts by requesting a content item (e.g., a movie or a television program) from the VOD server 104, and the VOD server 104 accepts this request.

In step 320, the VOD server 104 queries the social networking server 160 for a list of social networking friends of user 120. In an embodiment, user 120 is a registered user of the social networking server 160, and has granted permission to the social networking server 160 to obtain and/or store his list of social networking friends, and to share data from social TV database 161 with his social networking friends.

In an embodiment, the social networking server 160 or VOD server 104 is able to determine whether social networking friends of user 120 are subscribers to the service provider of server system 101, and whether they share a distribution node 150 with the user 120. In a further embodiment, social networking friends of user 120 must themselves be registered users of the social networking server 160 in order to be detected as subscribers to the service provider of server system 101.

In a further embodiment, for example, the social networking server 160 and/or VOD server 104 may have access to a subscriber database associated with server system 101. In a further example, each registered user of the social networking server 160 may be able to store information concerning their own service provider in social TV database 161, e.g., to facilitate matching of the registered user of the social networking server 160 with a client system 130 in a subscriber database.

Thus, in an illustrative embodiment, social networking friends of user 120 (including newly added social networking friends) can be properly categorized by the social networking server 160 or VOD server 104 into node-sharing group 270, non-node-sharing group 275, or non-subscriber group 280. Such a categorization can be stored, for example, in social TV database 161.

Accordingly, in step 330, the VOD server 104 is able to determine which social networking friends of user 120 are categorized into node-sharing group 270. In some embodiments, the VOD server 104 has received the full list of social networking friends of user 120, and then determines which of those social networking friends are in node-sharing group 270. In further embodiments, the VOD server 104 has received from social networking server 160 a list of only the social networking friends that are in node-sharing group 270. In still further embodiments, the VOD server 104 has received from social networking server 160 a full list of social networking friends, including group identifiers (e.g., flags or data fields) for identifying which of those social networking friends are in node-sharing group 270.

Social networking friends in node-sharing group 270 represent a "viewer set" of client systems 130 that can be proactively served the same content item by VOD server 104, without making additional bandwidth commitments (i.e., for bandwidth in access system 110). In an embodiment, the client systems 130 who are under the same node 150 in a HFC can receive the traffic broadcasted by a cable modem termination system (CMTS) without any additional resources being reserved. Advantageously, an embodiment allows the service provider of server system 101 to deliver the content item not only to the user 120, but to other STBs 114 in the node-sharing group 270 without making additional bandwidth commitments (i.e., for bandwidth in access system 110).

In step 340, once the node-sharing group 270 is identified by the VOD server 104, the VOD server 104 sends a video delivery start message to each STB 114 in the node-sharing group 270, including the STB 114 associated with the requesting user 120. This message includes information such as a multicast group session ID, required resources (e.g., storage space required for the content item), and the like. The STBs 114 of node-sharing group 270 which have the required resources on their end are able to join the multicast session and download the content item. The multicast session is then established and the content item can be delivered to the STBs 114 of those client systems 130 in the node-sharing group 270 that have sufficient resources.

Figure 4:
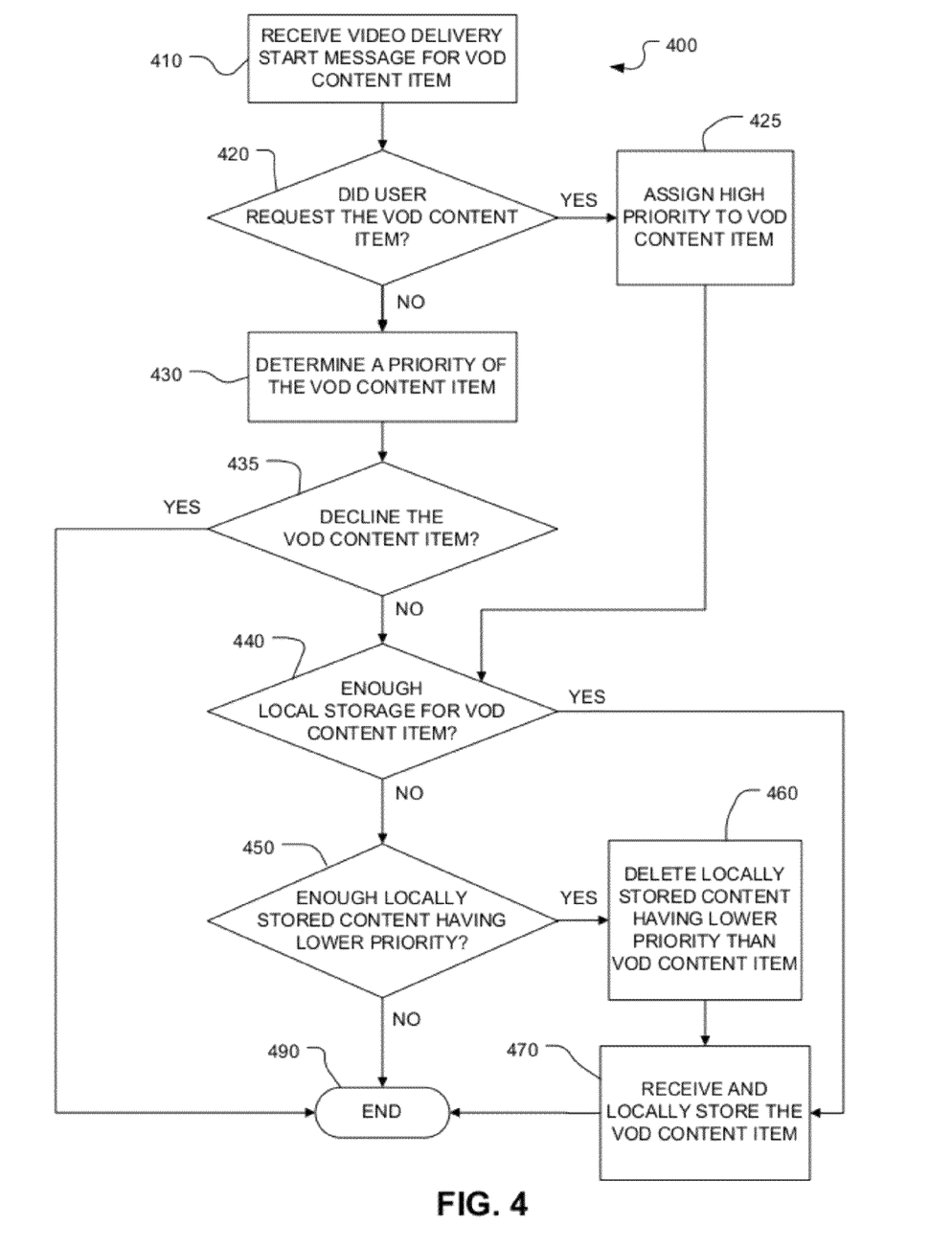
FIG. 4 is a flow diagram that illustrates a method in a client system according to an embodiment of the present invention.

FIG. 4 is a flow diagram that illustrates a method 400 in a client system 130 according to an embodiment of the present invention. In some embodiments, a processor and application software is provided in STB 114 for implementing the method 400, which can include the ability to support (e.g., directly or through an API) controlling and prioritizing stored content in local storage 115. In an embodiment, each client system 130 includes (e.g., in STB 114), or is communicatively coupled to, local storage 115 such as a hard disk or other form of persistent storage. Local storage 115 is typically limited. An embodiment prevents proactive delivery of VOD content items, as set forth above, from overwriting lower-priority content items that a user 120 may have expressly scheduled or downloaded for watching later.

In some embodiments, a database or directory in local storage 115 can contain metadata associated with content items in local storage 115, including storage priority values. The proactively delivered content item can be marked as having a lower priority than content items expressly requested by the user of STB 114; accordingly, STB 114 can be configured to automatically overwrite such lower-priority content when storage space is needed. This helps prevent the local storage 115 from too quickly becoming filled with content that the user 120 did not expressly request.

In step 410, a client system 130 receives the video delivery start message that was sent by VOD server 104 in step 340. Next, the client system 130 takes steps to determine whether to accept the delivery of the VOD content item (e.g., by joining a multicast session for receiving the VOD content item).

In step 420, client system 130 checks whether the user 120 associated with client system 130 expressly requested the VOD content item (e.g., in step 310 above). If the user 120 was the requester of step 310, the method proceeds to step 425. At step 425 a high priority is assigned to the VOD content item—in some embodiments, the highest possible priority is assigned—and the method proceeds to step 440.

However, if the user 120 was not the requester of step 310, but is rather a social networking friend of the requester, additional priority determinations may need to be made before the download is accepted, and the method proceeds to step 430.

In step 430, a priority value is determined for the VOD content item. In some embodiments, the priority value is based on whether the user has requested the VOD content item. For example, if the user did not request the VOD content item, the priority value will be lower than if the user did request the VOD content item.

It is noted that merely downloading the VOD content item to the STB 114 of a social networking friend does not force the social networking friend to pay for the VOD content item. The requesting user 120 who has explicitly requested the VOD content item will be responsible for paying for the VOD content item. Social networking friends of the requesting user 120 will only be responsible to pay for the VOD content item if and when they decide to watch it.

In a further embodiment, each user of the social networking system 160 can assign priorities to certain categories (e.g., genres, programs, and the like), indicating interest or lack of interest in each category. For example, in some embodiments, if the user of the social networking system 160 has indicated a total lack of interest in a genre, program, etc., that includes the VOD content item, the download can be declined (e.g., based on assigning a zero or negative priority value). In further embodiments, if the user of the social networking system 160 has indicated a relatively high or low lack of interest in a genre, program, etc., that includes the VOD content item, the priority of the VOD content item can be adjusted upward or downward.

In a still further embodiment, each user of the social networking system 160 can assign rankings to his own social networking friends, e.g., based on whether the user perceives that he generally shares viewing interests with a particular social networking friend. In some embodiments, a low-ranked friend (e.g., based on commonality of viewing interests) can result in declining all downloads for which the low-ranked friend is the requesting user. For example, content can be declined based on assigning the content a zero or negative priority value. In further embodiments, a relatively high or low ranking of a friend can result in assigning a correspondingly higher or lower priority to all VOD content items for which the friend is the requesting user, thus influencing what VOD content items are accepted for download.

In some embodiments, finely-grained priorities can be assigned to the lower-priority content items. In an illustrative example, suppose a new content item is more popularly requested among the social networking friends of user 120 than a previously recorded content item; naturally, the new content item may be more preferred by the user 120. So when the STB 114 of a viewer does not have enough space to record the new content item, in an embodiment, it can create sufficient space by overwriting a lower-priority (e.g., less popular) content item that was cached earlier.

In step 435, in some embodiments, an STB 114 can decline to join the multicast session (e.g., regardless of whether it has the required storage resources available), based on the priority determination in step 430. For example, in some embodiments, content can be declined if the content has been assigned a zero or negative priority value. If the content is declined, the method 400 skips to step 490 and terminates. If the content is not declined, the method 400 proceeds to step 440.

In step 440, the client system 130 determines whether it has sufficient local storage 115 available to store the VOD content item. If sufficient local storage 115 is available to store the VOD content item, the method 400 skips to step 470. If sufficient local storage 115 is not available to store the VOD content item, the method proceeds to step 450.

In step 450, the client system 130 determines whether there is enough locally stored content having a lower priority than the VOD content item, such that deleting it would create sufficient available space for storing the VOD content item. If not, the method 400 skips to step 490 and terminates without accepting the download. Otherwise, the client system 130 proceeds to step 460.

In step 460, the client system 130 can delete all or part of the locally stored content having a lower priority than the VOD content item. In some embodiments, the client system 130 can optimize which items are selected for deletion, in order to minimize the number of items deleted. The method 400 then proceeds to step 470.

In step 470, the client system 130 receives the VOD content item, e.g., by joining the multicast session identified by the video delivery start message received at step 410, and stores the VOD content item in local storage 115.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for using social networking information to conserve bandwidth in a video-on-demand (VOD) system operated by a service provider, the VOD system comprising a VOD server system communicatively coupled to a plurality of distribution nodes via an access network, wherein client systems receive VOD content from the VOD server system via one of the plurality of distribution nodes, the method comprising:
   in the VOD server system, accepting a request for a VOD content item from a first client system associated with a user of the VOD system;
   obtaining a list of social networking friends of the user;
   determining a node-sharing group of the list of social networking friends, the node-sharing group comprising the first client system and at least one client system sharing a particular distribution node of the plurality of distribution nodes with the first client system; and
   sending a video delivery start message through the shared particular distribution node to each client system in the node-sharing group in response to accepting the request for the VOD content item from the first client system.

2. The method of claim 1, further comprising multicasting the VOD content item through the shared distribution node.

3. The method of claim 1, wherein obtaining the list of social networking friends of the user further comprises obtaining the list from a social television database of the VOD system.

4. The method of claim 1, wherein obtaining the list of social networking friends of the user further comprises obtaining the list from a social networking portal external to the VOD system.

5. The method of claim 1, wherein determining the node-sharing group comprises:
   determining whether a social networking friend of the list of social networking friends subscribes to the service provider; and
   when the social networking friend is a subscriber to the service provider, determining whether a client system associated with the social networking friend shares the distribution node of the VOD server system with the first client system.

6. The method of claim 5, wherein determining whether the social networking friend is a subscriber comprises:
   determining whether the social networking friend is a registered user of a social networking server of the VOD server system.

7. The method of claim 1, wherein determining the node-sharing group further comprises storing information about the node-sharing group in a social television database of the VOD server system.

8. The method of claim 7, wherein the information is stored for each social networking friend associated with a client system of the node-sharing group.

9. The method of claim 1, wherein determining the node-sharing group comprises querying a subscriber database of the VOD server system.

10. The method of claim 1, wherein sending the video delivery start message through the shared particular distribution node to each client system in the node-sharing group comprises sending the video delivery start message through the shared particular distribution node only to each client system in the node-sharing group such that social networking friends of the user that are not in the node-sharing group are not sent video delivery start message.

11. A video-on-demand (VOD) system, comprising:
   a VOD server system; and
   a plurality of distribution nodes communicatively coupled to the VOD server system via an access network, wherein client systems receive VOD content from the VOD server system via one of the plurality of distribution nodes,
   wherein the VOD system:
      accepts a request for a VOD content item from a first client system associated with a user of the VOD system,
      obtains a list of social networking friends of the user,
      determines a node-sharing group of the list of social networking friends, the node-sharing group comprising the first client system and at least one client system sharing a particular distribution node of the plurality of distribution nodes with the first client system, and
      sends a video delivery start message through the shared particular distribution node to each client system in the node-sharing group in response to accepting the request for the VOD content item from the first client system.

12. The system of claim 11, wherein the VOD system multicasts the VOD content item through the shared distribution node.

13. The system of claim 11, wherein the VOD system obtains the list of social networking friends of the user further by obtaining the list from a social television database of the VOD system.

14. The system of claim 11, wherein the VOD system obtains the list of social networking friends of the user by obtaining the list from a social networking portal external to the VOD system.

15. The system of claim 11, wherein the VOD system determines the node-sharing group by:
   determining whether a social networking friend of the list of social networking friends subscribes to the service provider; and
   when the social networking friend is a subscriber to the service provider, determining whether a client system associated with the social networking friend shares the distribution node of the VOD server system with the first client system.

16. The system of claim 15, wherein determining whether the social networking friend is a subscriber comprises:
   determining whether the social networking friend is a registered user of a social networking server of the VOD server system.

17. The system of claim 11, wherein the VOD system determines the node-sharing group by storing information about the node-sharing group in a social television database of the VOD server system.

18. The system of claim 17, wherein the information is stored for each social networking friend associated with a client system of the node-sharing group.

19. The system of claim 11, wherein the VOD system determines the node-sharing group by querying a subscriber database of the VOD server system.

20. The system of claim 11, wherein the VOD system sends the video delivery start message through the shared particular distribution node to each client system in the node-sharing group by sending the video delivery start message through the shared particular distribution node only to each client system in the node-sharing group such that social networking friends of the user that are not in the node-sharing group are not sent video delivery start message.

* * * * *